United States Patent Office 3,850,873
Patented Nov. 26, 1974

3,850,873
MOLDING COMPOSITIONS OF POLYOXY-METHYLENES AND GLASS FIBERS
Rolf Wurmb, Heidelberg, Wilhelm Schuette, Speyer, Heinz-Ulrich Werther, Ludwigshafen, and Franz Schmidt, Mannheim, Germany, assignors to Badische Anilin- & Soda-Fabrik Aktiengesellschaft, Ludwigshafen (Rhine), Germany
No Drawing. Filed Mar. 2, 1973, Ser. No. 337,641
Claims priority, application Germany, Mar. 2, 1972,
P 22 09 985.0
Int. Cl. C08g 41/04
U.S. Cl. 260—37 AL    3 Claims

ABSTRACT OF THE DISCLOSURE

Thermoplastic molding compositions of polyoxymethylenes and glass fibers containing from 0.5 to 10% by weight, based on the total weight of the mixture, of a high molecular weight polyurethane having thermoplastic properties.

---

This invention relates to glass fiber-reinforced polyoxymethylenes exhibiting improved mechanical properties.

Polyoxymethylenes are materials distinguished by good mechanical properties. Even so, attempts to improve the properties of these materials by the incorporation of glass fibers have been going on for a long time. It is particularly desirable to improve the modulus of elasticity and the tensile strength. Glass fibers normally have only slight affinity for polymers, which means that an applied stress can only be transferred from the matrix to the glass fibers to a very slight extent. The tensile strength of such reinforced materials is therefore low. Attempts have therefore been made to improve adhesion between the glass fibers and the polyoxymethylene matrix by coating the glass fibers with adhesion promoters based on organosilanes and by other measures. For example, U.S. Pat. 3,455,867 describes a process whose object is to improve the adhesion between polyoxymethylene and glass fibers by cross-linking the mixture with isocyanates. According to U.K. Pat. 1,178,344 glass-fiber-reinforced polyoxymethylenes are manufactured by carrying out the polymerization of the monomers in the presence of the glass fibers, which have been coated with epoxide group-containing silanes. Both processes have their drawbacks, since poisonous isocyanates are used in one case and the polymerization has to be carried out in the presence of glass fibers in the other case.

It is an object of the present invention to provide molding compositions of glass-fiber-reinforced polyoxymethylenes which are distinguished by improved mechanical properties and which can be made without the above drawbacks.

The above object is achieved, according to the invention, with a molding composition consisting of polyoxymethylene and glass fibers, which additionally contains from 0.5 to 10% by weight and preferably from 2 to 5% by weight, based on the total weight of the mixture, of a high molecular weight polyurethane having thermoplastic properties.

We have found that, surprisingly the addition according to the present invention produces a distinct improvement in the tensile strength of glass-fiber-reinforced polyoxymethylenes.

Another unexpected result is the extremely high impact strength attained by the compositions of the invention compared with mixtures containing no polyurethane.

Suitable polyurethanes are those which have been prepared from polyesters, polyethers such as polyethyleneglycol ethers, polypropyleneglycol ethers or polyacetals having free hydroxyl end groups and polyisocyanates, in particular diisocyanates, using chain-extending agents such as low molecular weight polyols, preferably glycols.

The polyoxymethylenes which may be used in the present invention include homopolymers of formaldehyde and copolymers of formaldehyde or of trioxane with cyclic and linear formals such as 1,3-dioxolane, butanediol formal or with epoxides such as ethylene oxide or propylene oxide.

Homopolymers should have thermally stable end groups, for example ester or ether groups. Copolymers of trioxane should contain more than about 50% and preferably more than about 75% of oxymethylene groups and at least approx. 0.1% of groups of comonomer introducing at least two vicinal carbon atoms into the oxymethylene chain. Such copolymers may be made in a conventional manner by cationic copolymerization of trioxane with suitable comonomers, e.g. cyclic ethers or acetals such as ethylene oxide, 1,3-dioxolane, 1,3-dioxane, 1,3-dioxycycloheptane, 1,3,6-trioxacyclooctane or with linear oligo- or poly-formals or acetals such as polydioxolane and polybutanediol formal.

The polymers may contain conventional heat and light stabilizers or other additives such as dyes.

Suitable glass fibers for use in the present invention are those which are commercially available, such as glass fibers K 35 or K 127 sold by Gevetex Textilglas G.m.b.H. or glass fibers 409 sold by Owens Corning Fiberglas. Particularly suitable are those which have been coated with epoxide group-containing adhesion promotors. The glass fibers have diameters of from 8 to 14μ. The glass fibers may be used as continuous roving or in chopped form. The incorporation of the glass fibers and polyurethanes into the polyoxymethylenes may be carried out in any suitable mixing extruder. Particularly suitable are twin-shaft mixing extruders permitting the introduction of roving. The length of the glass fibers in the finished mixture should be not less than 0.2 mm. and not more than 6 mm. The amount of glass fibers should be from 10 to 60% and preferably from 20 to 35% by weight.

EXAMPLE

The mixtures listed in Table 1 below were prepared as follows:

The polyoxymethylene, optionally together with the polyurethane, was melted in a twin-shaft extruder (ZSK model manufactured by Werner und Pfleiderer). The glass fibers, either as roving or in chopped form, were introduced into the hot plastics melt through a port provided downstream of the melting zone. The melt containing the comminuted glass fibers was extruded through a die and the extrudate was granulated by suitable means. The granules were injection-molded to form test specimens which were used in ascertaining the mechanical properties listed in Table 1.

| Polyoxy-methylene | Poly-urethane | Glass fibers | Tensile strength (kg./cm.² DIN 53,455) | Impact strength (cm.-kg./cm.² DIN 53,453) |
|---|---|---|---|---|
| A | | A | 876 | 9.5 |
| A | | B | 850 | 10.8 |
| A | 2% A | A | 1,138 | 13.9 |
| A | 5% B | B | 1,150 | 14.2 |
| A | 5% A | C | 1,230 | 13.8 |
| A | 2% A | D | 1,380 | 19.8 |
| B | 2% B | C | 1,180 | 15.2 |
| B | 5% B | D | 1,350 | 20.1 |
| B | 5% A | B | 1,280 | 16.2 |

NOTE:
Polyoxymethylene A: copolymer of trioxane with 4% by weight of ethylene oxide.[1]
Polyoxymethylene B: copolymer of trioxane with 5% by weight of 1,3-dioxane.[1]
Glass fibers A: Type 409 sold by Owens Corning Fiberglas.
Glass fibers B: Type K 35 sold by Gevetex Textilglas GmbH.
Glass fibers C: Type 861 sold by Owens Corning Fiberglas, treated with silane adhesion promoter A 151, vinyl-triethoxy silane sold by Union Carbide.
Glass fibers D: Type 861 sold by Owens Corning Fiberglas, treated with silane adhesion promoter A 187, glycidoxypropyltrimethoxy silane sold by Union Carbide.
Polyurethane A: Thermoplastic polyurethane elastomer having a Shore hardness of 94±1, A/53±2D, manufactured in a conventional manner from a polyester diol, an aromatic diisocyanate and a short chain diol, for example from polyethyleneglycol adipate (1.500 g., mol. wt. about 2,000), 4,4'-diphenylmethane diisocyanate (1,200 g.) and 1,4-butanediol (334 g.).
Polyurethane B: Thermoplastic polyurethane elastomer having a Shore hardness of 85±1, A/35±1D, manufactured in a conventional manner from a copolyester diol, an aliphatic diisocyanate and a short-chain diol, for example from 1,000 g. of an adipic acid hexanediol/neopentylglycol copolyester (mol. wt. about 2,000), 259 g. of hexamethylene diisocyanate and 92.3 g. of butanediol-1,4.
[1] Melt index at 190° C. under a load of 2.16 kg. is from 8 to 10.

We claim:

1. An improved thermoplastic molding composition of ployoxymethylenes selected from the group consisting of homopolymers of formaldehyde and copolymers of formaldehyde or trioxane, said homopolymers having thermally stable end groups and said copolymers containing more than about 50% of oxymethylene groups and at least about 0.1% of the comonomer having at least two vicinal carbon atoms, from 10 to 60% by weight of glass fibers, and from 0.5 to 10% by weight, based on the total weight of the mixture, of a high molecular weight polyurethane exhibiting thermoplastic properties, said polyurethane having been prepared from polyesters, polyethers such as polyethyleneglycol ethers, polypropyleneglycol ethers or polyacetals having free hydroxyl end groups and polyisocyanates using chain-extending agents such as low molecular weight polyols.

2. An improved thermoplastic molding composition according to claim 1 wherein the amount of glass fibers by weight is 20 to 35% and wherein the amount of polyurethane is from 2 to 5% by weight.

3. An improved thermoplastic molding composition according to claim 1 wherein said polyurethane has been prepared from a polyester diol, an aromatic diisocyanate and a short-chain diol.

References Cited

UNITED STATES PATENTS 3,450,665   6/1969   Wagner et al. _____ 260—37 AL

FOREIGN PATENTS 1,031,701   6/1966   Great Britain _____ 260—37 AL
1,031,710   6/1966   Great Britain _____ 260—37 AL
720,875   11/1965   Canada _____ 260—37 AL MORRIS LIEBMAN, Primary Examiner S. L. FOX, Assistant Examiner U.S. Cl. X.R.

260—858